United States Patent [19]
Bone et al.

[11] Patent Number: 5,675,516
[45] Date of Patent: Oct. 7, 1997

[54] SYSTEM AND METHOD FOR DETERMINING PUSHUP OF A MOLDED GLASS CONTAINER

[75] Inventors: James W. Bone, Indian Rocks; Robert J. Douglas, Palm Harbor; Bozidar Kosta, Clearwater, all of Fla.

[73] Assignee: Inex Vision Systems, Inc., Clearwater, Fla.

[21] Appl. No.: 534,496

[22] Filed: Sep. 27, 1995

[51] Int. Cl.$^6$ ........................................... G01C 5/00
[52] U.S. Cl. ..................... 364/562; 209/522; 209/597; 356/240
[58] Field of Search ................. 364/562; 209/522, 209/521, 597, 606; 356/240, 237

[56] References Cited

U.S. PATENT DOCUMENTS

| | | | |
|---|---|---|---|
| 3,273,710 | 9/1966 | Early et al. | 209/88 |
| 3,823,822 | 7/1974 | Cochran et al. | 209/80 |
| 3,866,753 | 2/1975 | Milton | 209/73 |
| 4,021,122 | 5/1977 | Krenmayr | 356/240 |
| 4,044,891 | 8/1977 | Pynsky | 209/73 |
| 4,283,145 | 8/1981 | Miynzawa | 356/364 |
| 4,399,357 | 8/1983 | Dorf et al. | 250/233 B |
| 4,798,096 | 1/1989 | Bogatzki | 73/12 |
| 4,852,415 | 8/1989 | Bogatzki et al. | 73/865.8 |
| 4,874,940 | 10/1989 | McMeekin et al. | 250/223 |
| 4,915,237 | 4/1990 | Chang et al. | 209/524 |
| 4,930,364 | 6/1990 | Baker et al. | 73/865.8 |
| 4,931,632 | 6/1990 | Brandt | 250/223 B |
| 4,955,227 | 9/1990 | Fujita et al. | 73/104 |
| 4,996,658 | 2/1991 | Baker | 364/571.04 |
| 5,259,716 | 11/1993 | Hoshino et al. | 414/225 |
| 5,499,718 | 3/1996 | Bhatia et al. | 209/524 |
| 5,532,605 | 7/1996 | Dimmick et al. | 324/671 |
| 5,558,233 | 9/1996 | Dimmick et al. | 209/522 |

OTHER PUBLICATIONS

Using Capacitive Sensing for Noncontact Dimensional Gauging; ADE Corporation; 1990.
Analog Capacitive Sensors; Locon Sensor Products; Date Unavailable.
High Temperature Capacitive Sensors with Separate DC Amplifier; Locon Sensor Products; Date Unavailable.
Non–Contact Dimensional Gaging Using Capacitive Sensing; ADE Corporation; 1987.
Capacitive Sensors; Locon Sensor Products; 1991.
Locon Sensor Products; pp. 8.02–8.04; Date Unavailable.

*Primary Examiner*—James P. Trammell
*Assistant Examiner*—Patrick Assouad
*Attorney, Agent, or Firm*—Senniger, Powers, Leavitt & Roedel

[57] ABSTRACT

System and method of operation thereof for inspecting glass containers handled by a glass container handling apparatus to determine a height of a bottom of at least one of the containers. The system includes a base adapted to be positioned adjacent the container handling apparatus and adapted to receive the bottom of the containers handled by the container handling apparatus. At least one of the containers is positioned on the base and a capacitive sensor on the base provides an electric field adjacent the capacitive sensor and senses a capacitance affected by the container bottom being positioned in the electric field. The capacitive sensor generates a signal representative of the sensed capacitance which is a function of the height of the container bottom relative to the base. In response to the signal from the capacitive sensor, the processor determines the height of the container bottom based on the sensed capacitance as indicated by the signal.

31 Claims, 4 Drawing Sheets

SYSTEM AND METHOD FOR DETERMINING PUSHUP OF A MOLDED GLASS CONTAINER

BACKGROUND OF THE INVENTION

The invention generally relates to glass container inspection systems and, particularly, to a capacitive sensing system for determining the pushup of a glass container.

Glass containers, such as bottles and jars, typically include a portion of their bottoms that is raised with respect to the portion of their bottoms that engages a surface upon which the containers rest. The raised portion of the container bottom, sometimes referred to as the "kick" or "punt", has a height, relative to the engaged surface. This height is referred to as the "pushup" of the container. Since the pushup of a container affects the container's volume, manufacturing processes must be accurately controlled to provide a relatively uniform pushup.

Presently available apparatus and methods for determining a container's pushup require manual operation of a measuring device to measure the bottom height of the container. In addition to the problems associated with manual measurements, namely, operator error and cost, conventional measuring devices require touching the container bottom to measure the pushup. For example, a typical pin gauge includes a pin which deflects when pressed against the container bottom and a dial for indicating a distance measurement corresponding to the amount of pin deflection. A major disadvantage associated with touching the bottom of a glass container is an increased risk of container failure. As is known in the art, conventional manufacturing processes include spraying a protective coating, such as tin or titanium, on the outside surface of glass containers. However, the protective coating is not applied to the bottom of the container. As such, touching the raised portion of the bottom of a glass container during manufacture subjects the container to the possibility of nicks or cuts on the container's bottom. Any such nicks or cuts dramatically increase the risk that the container will fail. As an example, a typical beverage bottle is able to withstand an internal pressure of 300 psi. However, the same bottle with a nicked bottom is likely to fail at an internal pressure of merely 50 psi.

For these reasons, an accurate system for inspecting a glass container to determine its pushup is needed that does not contact the container bottom and that is adapted for use with an automated container handling apparatus.

Further, due to the nature of glass molding and container manufacturing processes, sensors and the like used with such processes are often subject to temperature and/or humidity variations and the like. These variations in operating conditions cause errors in measurements taken by such sensors. Therefore, a system for inspecting a glass container to determine its pushup is needed that compensates for variations in temperature and/or humidity to provide accurate pushup measurements.

SUMMARY OF THE INVENTION

Among the objects of the invention are to provide an improved system and method of determining the pushup of a glass container which overcome at least some of the disadvantageous conditions described above; to provide such a system and method which permit accurate measurements of a container's pushup; to provide such system and method which permit measuring the container's pushup without touching the container bottom; to provide such system and method which permit use with an automated container handling apparatus; to provide such system and method which permit calibration of the pushup measurement; to provide such system and method which permit correcting for the effects of temperature and/or humidity variations on the pushup measurement; and to provide such a system and method which are efficient, reliable, economical and convenient to use.

Briefly described, a system embodying aspects of the present invention inspects glass containers handled by a glass container handling apparatus to determine a height of a bottom of at least one of the containers. The system includes a base adapted to be positioned adjacent the container handling apparatus and adapted to receive the bottom of the containers handled by the container handling apparatus. At least one of the containers is positioned on the base and a proximity sensor generates a signal representative of a distance between a surface of the proximity sensor and the container bottom wherein the distance is a function of the height of the container bottom relative to the base. In response to the signal from the proximity sensor, the processor determines the height of the container bottom based on the distance as indicated by the signal.

Generally, another form of the invention is a method of operating a system for inspecting glass containers handled by a glass container handling apparatus to determine a height of a bottom of the containers relative to a base positioned adjacent the apparatus and adapted to receive the bottom of the containers handled by the container handling apparatus. The method includes the steps of positioning at least one of the containers on the base and generating a signal representative of a distance between a surface of a proximity sensor and the container bottom wherein the distance is a function of the height of the container bottom relative to the base. The method also includes the step of determining the height of the container bottom based on the distance as indicated by the signal.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
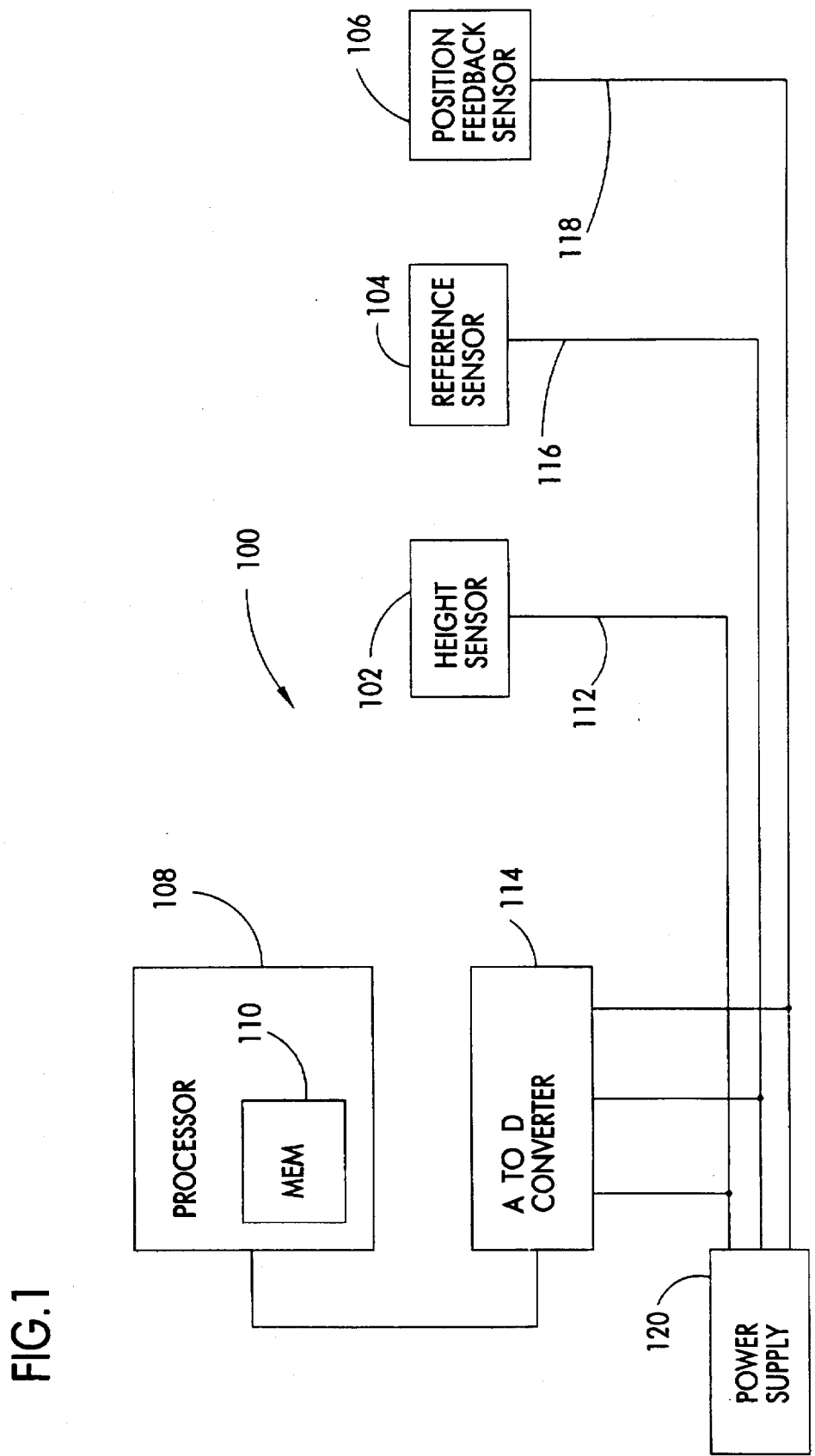
FIG. 1 is a block diagram of a system for inspecting glass containers including a capacitance sensor and a reference sensor according to a preferred embodiment of the invention.

Referring now to FIG. 1, one preferred embodiment of an inspection system 100 is shown, including a height sensor 102, for use with a container handling apparatus (see FIG.

5). In addition to the height sensor 102, the system 100 includes a reference sensor 104 and a position feedback sensor 106, all providing signals to a processor 108 having a memory 110. According to the invention, height sensor 102 provides an analog signal via line 112 to an analog-to-digital converter 114 which converts the signal to a digital signal for processing by the processor 108. The reference sensor 104 and the position feedback sensor 106 likewise provide analog signals to the analog-to-digital converter 114 via lines 116 and 118, respectively. A power supply 120 provides electrical current to each of the components of system 100 shown in FIG. 1. In one preferred embodiment, analog-to digital converter 114 is part of a programmable logic controller (not shown), such as the PLC 95U manufactured by Siemens, and processor 108 is a personal computer system including a processor chip, such as the Intel 486DX2.

Figure 2:
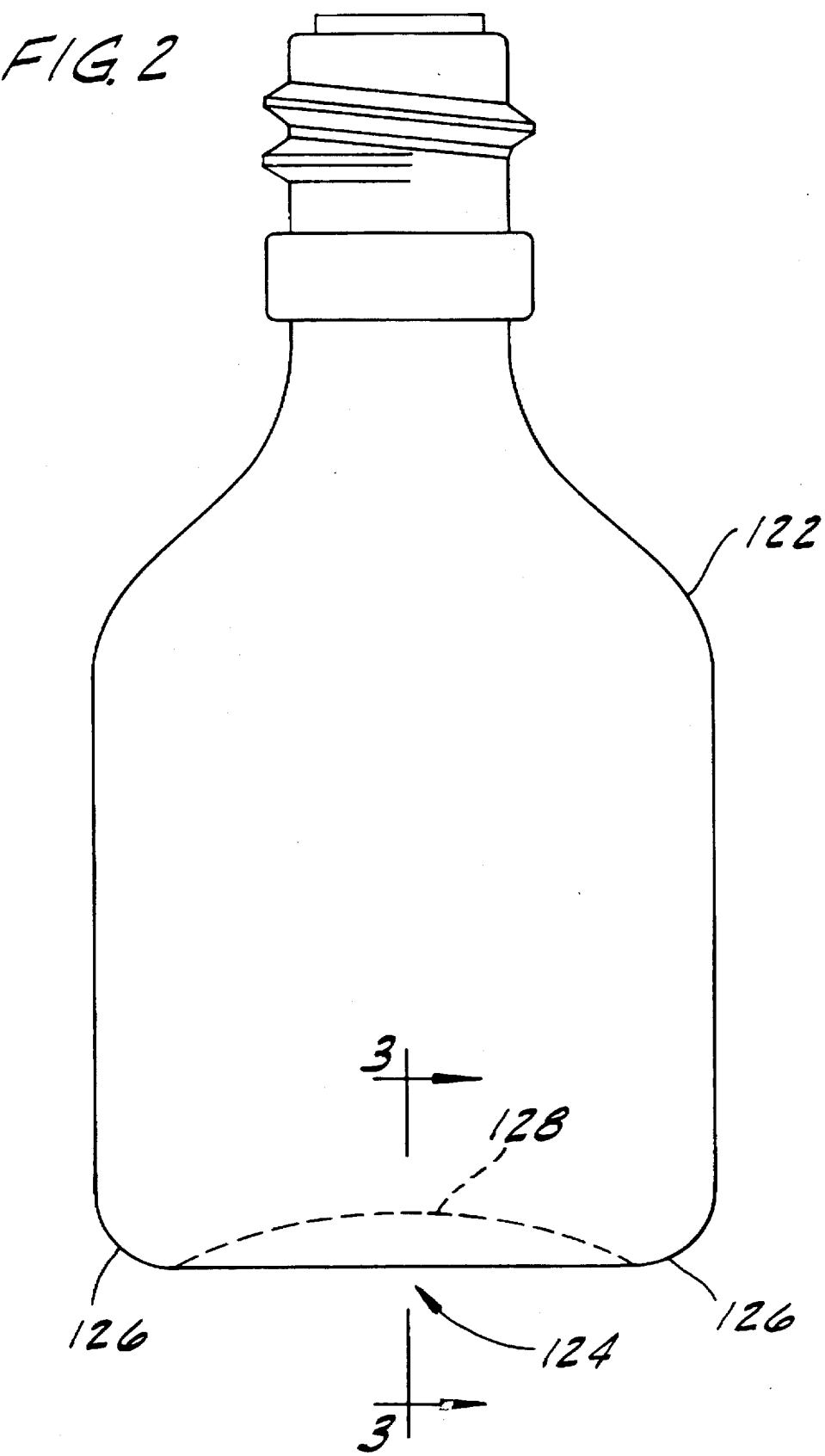
FIG. 2 shows an exemplary glass container to be inspected by the system of FIG. 1.

FIG. 2 illustrates an exemplary glass container 122 for inspection by system 100. The glass container 122, shown as a bottle, has a bottom 124 including a base portion 126 for engaging a surface (not shown) upon which container 122 rests and a raised portion 128 (shown in phantom) that extends generally upwardly from the base portion 126. In other words, the bottom 124 is inwardly hollow or concave. In one preferred embodiment, base portion 126 of bottom 124 is generally annular and raised portion 128 is central to base portion 126 and generally concave. According to the invention, system 100 inspects container 122 to determine the height of raised portion 128 of bottom 124. The height of raised portion 128 is also referred to as the "pushup" of container 122. It is to be understood that although container 122 is illustrated as a bottle, system 100 advantageously determines the height of raised portion 128 for different containers having raised bottom portions of various shapes.

Figure 3:
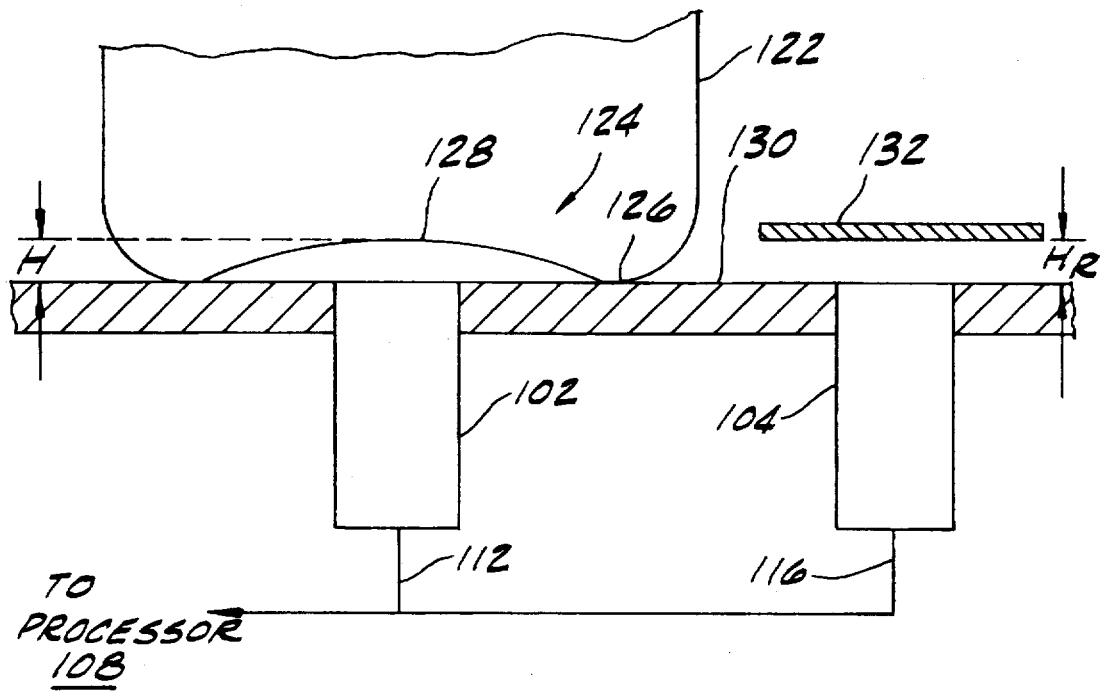
FIG. 3 is a cross-sectional view of the glass container of FIG. 2 relative to the capacitive sensor and reference sensor of FIG. 1.

FIG. 3 illustrates container 122 in cross-section and shows its relationship to sensors 102 and 104. As shown, system 100 further includes a base 130 having a planar, level top surface that is adapted to receive bottom 124 of container 122. According to the invention, the container handling apparatus (see FIG. 5) positions container 122 on the base 130 adjacent height sensor 102. Preferably, height sensor 102 is an analog capacitive sensor of the type manufactured by Locon Sensor Systems, Inc. as Article No. LCC-A-18-8-4120-F. Locon sensors and the like detect objects which are within their response range without contact based on the effect of these objects on the electric field near the active sensor surface of the sensors. Thus, height sensor 102 constitutes a proximity sensor. It is to be understood that the principles of the present invention may also be accomplished by other types of non-contacting proximity sensors, such as ultrasonic or inductive sensors.

According to the invention, height sensor 102 generates an analog signal via line 112 that is representative of a sensed capacitance. Sensor 102 provides an electric field adjacent base 130 so that the placement of container 122 on base 130 affects the electric field. The change caused by the presence of container 130 in the electric field is sensed by height sensor 102 as a change in a sensed capacitance. Thus, the sensed capacitance is a function of the height of container bottom 124 relative to base 130. By analogy, bottom 124, i.e., the target surface, and sensor 102 can be considered as two plates of a capacitor in which the air gap between the two acts as the capacitor dielectric. As stated above, sensor 102 sets up an electric field between sensor 102 and bottom 124 wherein circuit activity in sensor 102 varies with the capacitance of the sensor/target combination. The sensed capacitance is a function of the sensor-to-target separation which can be determined by monitoring the voltage applied or the current flow to sensor 102.

In a preferred embodiment, sensor 102 is recessed in base 130 with its top surface relatively flush with the top surface of base 130 so that base portion 126 of container 122 rests on a relatively flat surface. Processor 108, in response to the sensed capacitance as represented by the signal from sensor 102, determines the height, H, of raised portion 128 relative to base 130. Although container 122 is shown in a vertical or upright orientation, it is to be understood that this orientation is merely illustrative. System 100 determines the distance from base 130 to portion 128 of bottom 124 based on the sensed capacitance without regard to the orientation of container 122 so long as the relationship of bottom 124 to sensor 102 is generally the same.

FIG. 3 further illustrates reference sensor 104 positioned adjacent height sensor 102 for calibrating system 100 and for correcting errors in the height measurements caused by the effects of temperature, humidity and the like. Glass manufacturing processes often present a relatively hostile environment for capacitance measurements because variations in temperature, humidity and the like affect the sensed capacitance. Reference sensor 104 preferably senses a reference capacitance that is generally independent of the height of bottom 124 of container 122 and generates an analog signal representative of the reference capacitance. In a preferred embodiment of the invention, reference sensor 104 is substantially identical to height sensor 102 and senses a reference capacitance. According to the invention, a plate 132 is positioned a reference distance, $H_R$, from the top surface of sensor 104 in its electric field. Preferably, the plate 132 is a piece of material, such as steel, positioned above reference sensor 104. As an example, $H_R$=0.2 inches. Processor 108 comprises a circuit responsive to the signal from reference sensor 104 for calibrating height sensor 102 as a function of changes in the reference capacitance over time as sensed by reference sensor 104. In this manner, system 100 compensates for the effects of temperature and/or humidity on the capacitance sensed by height sensor 102.

According to a preferred embodiment of the invention, memory 110 stores predetermined information corresponding to sample height measurements and the capacitance sensed by sensor 102. Processor 108 retrieves the predetermined height information from memory 110 in response to the signal from the height sensor 102. In one embodiment, the predetermined information stored in memory 110 comprises a table of values. Each of the values corresponds to the capacitance sensed by height sensor 102 when a plate of glass (not shown) is positioned a known distance from sensor 102.

Before measuring the pushup of unknown containers, an operator first determines the characteristic response of the capacitive height sensor 102 by positioning a sheet of plate glass over sensor 102 at various distances. For example, the operator records data from height sensor 102 corresponding to the capacitance sensed as the plate of glass moves up in one-tenth of an inch increments. Memory 110 stores this data is as a table of values. Memory 110 also records a nominal reading of reference sensor 104 taken at this time.

In a preferred embodiment, sensor 102 outputs an analog signal representative of the capacitance sensed by sensor 102 when the plate of glass is at different distances from sensor 102. Sensor 104 likewise outputs an analog signal representative of the reference capacitance. Optimally, these analog signals range from 0–10 V. According to a preferred embodiment of the invention, system 100 includes analogto-digital converter 114 for converting the analog signals from sensors 102 and 104 to a digital value for storing in memory 110. Table 1, below, illustrates a sample table stored in memory 110.

TABLE 1

| GLASS HEIGHT (IN.) | 0.00 | 0.01 | 0.02 | 0.03 | 0.04 | 0.05 | 0.06 |
|---|---|---|---|---|---|---|---|
| SIGNAL | 338 | 382 | 430 | 476 | 518 | 560 | 606 |
| GLASS HEIGHT (IN.) | 0.07 | 0.08 | 0.09 | 0.10 | 0.11 | 0.12 | 0.13 |
| SIGNAL | 646 | 694 | 742 | 792 | 846 | 906 | 970 |
| GLASS HEIGHT (IN.) | 0.14 | 0.15 | 0.16 | 0.17 | 0.18 | 0.19 | 0.20 |
| SIGNAL | 1040 | 1112 | 1192 | 1268 | 1344 | 1424 | 1508 |

In order to initially calibrate system 100, the operator presents a container with a known pushup to height sensor 102. System 100 first adjusts the raw data provided by sensor 102 based on the percentage change of the reference capacitance as sensed by reference sensor 104 according to the following equation: $V_{COMP}=(V_{RAW}*V_{CAL})/V_{REF}$. The parameter $V_{RAW}$ is the digital value corresponding to the analog sensor signal provided by sensor 102; the parameter $V_{CAL}$ is the stored digital value corresponding to the analog sensor signal provided by reference sensor 104 at the time of tabulating the predetermined height information; and the parameter $V_{REF}$ is the digital value corresponding to the analog sensor signal currently provided by reference sensor 104. The parameter $V_{COMP}$ is the digital value corresponding to a sensor signal which compensates for the effects of temperature, humidity and the like on the measurement. Processor 108 then searches the table stored in memory 110 and retrieves a glass height measurement corresponding to the value of $V_{COMP}$. Based on a comparison of the retrieved glass height measurement and the known pushup, processor 108 calculates a correction factor, CF, for use in determining the pushup height for the particular type of containers 122 being inspected. Processor 108 determines the correction factor, CF, by dividing the known pushup height by the glass height value retrieved from memory 110. According to the invention, processor 108 comprises a circuit for comparing the determined height of bottom 124 to a known height.

System 100 operates by the following steps: 1) processor 108 adjusts the value of $V_{RAW}$ to compensate for any change that has occurred in the reading of reference sensor 104; 2) processor 108 searches the table stored in memory 110 to retrieve a glass height measurement corresponding to the value $V_{COMP}$; and 3) processor 108 corrects the retrieved glass height value by multiplying it by CF to obtain the actual pushup for the particular container 122 being sampled.

As an example, assume that at the time of calibration $V_{CAL}=1500$. Sensor 102 yields a signal corresponding to $V_{RAW}=1300$ when a reference bottle having a known pushup height of 0.18 inches is positioned on sensor 102. Also, at the time of the sampling, $V_{REF}=1535$. In this instance, $V_{COMP}=(1300*1500)/1535=1270$ corresponding to an approximate height of 0.17 inches. Since the actual pushup height is 0.18 inches, CF=0.18/0.17=1.06. After calibrating system 100, bottles of the same type as the reference bottle may be inspected to determine their pushup.

Further to the example, if sensor 102 provides a value $V_{RAW}=1360$ for a bottle having an unknown pushup and if 1347 reference sensor 104 provides a value $V_{REF}=1515$, then $V_{COMP}=1347$ corresponding to an approximate height of 0.18 inches. Multiplying the retrieved height by CF=1.06 yields an actual pushup of 0.19 inches.

Figure 4:
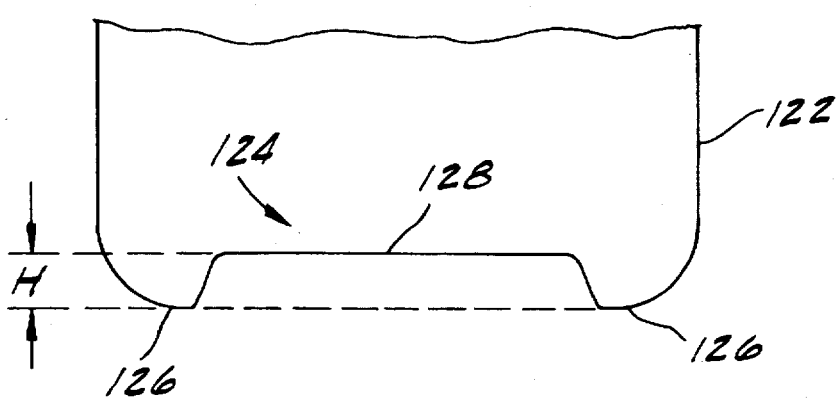
FIG. 4 is a cross-sectional view of an alternative glass container.

As shown in FIG. 4, bottom 124 of container 122 alternatively has a relatively flat raised portion 128 extending generally upwardly from base portion 126. It is to be understood that the principles of the present invention are applicable to containers of various shapes and sizes.

In one preferred embodiment of the invention, system 100 is part of a system for inspecting articles, such as glass containers. U.S. Pat. No. 4,906,098, the entire disclosure of which is incorporated herein by reference, shows an optical profile measuring apparatus with which the present invention is suitable for use. In this patent, "profile" means a dimensional representation of an object viewed from the side, i.e., the external dimensions of the object and the relationship between the dimensions.

Other inspection systems, measuring devices, and improvements for such are disclosed in U.S. Pat. No. 4,082,463, U.S. Pat. No. 4,074,938, and U.S. Pat. No. 4,097,158, the entire disclosures of which are also incorporated herein by reference. U.S. Pat. No. 4,082,463 shows a calibrated optical micrometer and U.S. Pat. No. 4,074,938 shows an optical dimension measuring device employing an elongated, focused beam. U.S. Pat. No. 4,097,158 shows a half-maximum threshold circuit for an optical micrometer.

Figure 5:
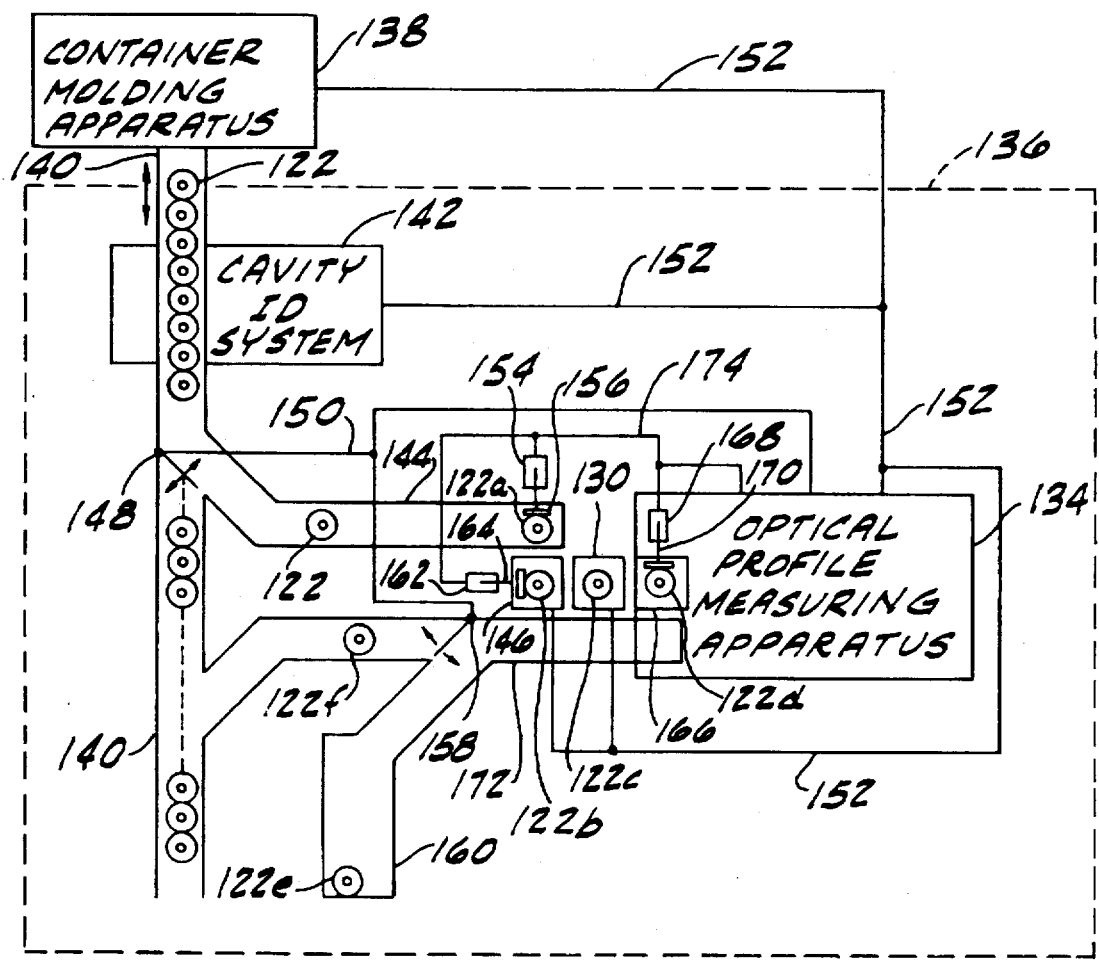
FIG. 5 is a diagrammatic top plan view of the system of FIG. 1 in combination with a container handling apparatus carrying containers from a container molding apparatus through a cavity identification system and an optical profile measuring apparatus.

Referring to FIG. 5, an optical profile measuring apparatus of the type disclosed in U.S. Pat. No. 4,906,098 is generally referred to by reference character 134. It is contemplated that the profile measuring apparatus 134 may be used to measure the profile of any article such as a bottle, automotive part, plastic part, or other article of manufacture. In one preferred embodiment of the invention, it is contemplated that profile measuring apparatus 134 be used as part of an apparatus for inspecting an article manufactured with multiple cavities or molds, such as a container inspection system generally referred to by reference character 136 for inspecting a plurality of containers 122 manufactured by a container molding apparatus 138. The term "profile", as used herein, refers to a dimensional representation of the article as viewed from a side, i.e., the external dimensions of an article and the spatial relationship between the dimensions of the portions of the article. For example, a profile of a bottle having a neck tapering into a cylindrical body would include the various diameters of the neck and body and the height of the neck, taper and body. These measurements are taken from various side perspectives of the bottle in relation to a (vertical) first reference to determine its ovality as well. The lean of the bottle is the inclination of the bottle away from the vertical when the bottle is supported in a substantially vertical position on a substantially horizontal surface. The lean of the bottle defines the spatial relationship between the neck, taper and body as compared to a vertical reference and is part of the profile. The tilt of the bottle defines the spatial relationship between the top and bottom surfaces of the bottle, i.e., between the sealing surface and the heel, and can be determined by measuring the height of the bottle as viewed from various side perspectives. In addition, an internal profile of an object having an opening therethrough can also be determined by apparatus 100.

The container molding apparatus 138 generally consists of a machine having a plurality of molds or cavities used to form containers, such as bottles, from molten glass or other materials. Although the present invention performs advantageously for molded glass containers, it is to be understood that the principles of the invention may also be applied to containers manufactured by a variety of processes from a variety of materials such as glass, plastic, metal and ceramic. Each mold of the machine can have unique markings so that products of a particular cavity can be readily identified.

Many systems known in the prior art provide cavity identification. For example, each cavity may provide markings on the bottom or side of the container which can be detected to determine the mold from which the container was made. Variously spaced concentric rings, dots or other markings may be molded into the base or heel of the containers with each cavity providing markings which have a unique spacing or design.

After containers 122 are molded by container molding apparatus 138, a high speed production conveyor 140 delivers containers 122 to a cavity identification system for identifying the cavity from which each of containers 122 was molded. The conveyer 140 may be any standard container moving apparatus known in the prior art such as a horizontal belt conveyer or a channel through which the containers are pushed. The cavity identification system 142 is any system which can detect the various markings on the base or heel of the container to determine and identify the cavity from which a particular container 122 was made so that, during later inspection operations, the cavity of an unacceptable container can be readily identified. Generally, containers 122 are provided by container molding apparatus 138 at a relatively high rate of speed. For example, a bottle molding apparatus provides bottles at a rate of approximately 300 bottles per minute. The speed of conveyer 140 is synchronized to carry the containers 122 and cavity identification system 142 is also synchronized to this speed.

After the cavity of origin of containers 122 is identified, conveyer 140 carries containers 122 past a conveyer branch 144 which supplies containers 122 to a weight station 146, pushup measuring system 100 and to optical profile measuring apparatus 134.

As described in U.S. Pat. No. 4,906,098, one preferred embodiment of optical profile measuring apparatus 134 includes optical micrometer, a central processing unit and means for aligning the portions of the article to be profiled with a predefined plane such as means for moving the container 122 through a predefined plane so that each portion of the container to be profiled passes through the predefined plane. Alternatively, the measuring plane may scan the container 122 so that the measuring plane optically moves over the container 122. According to one preferred embodiment of the present invention, the central processing unit of profile measuring apparatus 134 is the same as processor 108.

Processor 108 controls a diverting gate 148 via line 150 to selectively provide containers for profiling to the branch 144. Cavity identification system provides profile measuring apparatus 134 with information regarding the cavity from which each container 122 is made via a line 152. This information permits profile measuring apparatus 134 to randomly or pseudo-randomly select which of containers 122 are to be profiled or to systematically and periodically select containers 122 from each of the cavities to be profiled. Weight station 146 provides profile measuring apparatus 134 with the weight of each container 122 via line 152 so that containers 122 for profiling may be selected based on weight. In a preferred embodiment of the invention, line 152 includes lines 112, 116 and 118 of system 100.

Conveyer branch 144 carries containers 122 to a first transfer station including a pneumatic cylinder 154 which actuates a push rod 156 to move container 122a from conveyer branch 144 to weight station 146. Cavity identification system 142 identifies containers 122 and samples from each mold are selected for measurement. The selected sample is transported in such a way that measurement data can be correlated with the cavity number. In particular, each container 122 is weighed at weight station 146 to verify its weight indicating that the right amount of product (e.g., glass, plastic, ceramic, metal) has been used to form the particular container 122. If the weight of container 122 is not within acceptable tolerances, weight station 146 activates a gate 158 at the appropriate time via profile measuring apparatus 134 and line 150 to move the unacceptable container 122 into a reject deposit area 160. Weight station 146 communicates with the cavity identification system 142 and profile measuring apparatus 134 via line 152 so that weight station 146 knows the cavity identity of each container 122 it weighs and can advise profile measuring apparatus 134 of containers 122 which have an out-of-tolerance weight and need not be profiled. Further, if it is determined that a pattern failure exists and this failure is due to containers 122 being made in a particular cavity, weight station 146 and/or profile measuring apparatus 134 can notify container molding apparatus 138 (or the operator) via line 152 which cavity is providing unacceptable containers 122 so that the problem can be corrected or so that molding apparatus 138 can be shut down to diagnose the problem more fully. After weighing, the sample proceeds to base 130 of system 100 for capacitive sensing to determine the height of its bottom 124.

Container 122b is located at a second transfer station including a pneumatic cylinder 162 which actuates a push rod 164 to move container 122b from weight station 146 to base 130. The push rod 164 positions container 122c on base 130 for capacitive sensing. After determining the pushup of container 122c, the pneumatic cylinder 162 further actuates push rod 164 to move container 122b from base 130 to a profiling platform 166. The sample proceeds to the profiling platform 166 of optical profile measuring apparatus 134 for determination of the profile of selected portions. Alternatively, profiling may not be performed if the weighing determines that the sample is out of tolerance. After optical profile measuring apparatus 134 has completed its profile of container 122d located on profiling platform 166, a pneumatic cylinder 168 actuates a push rod 170 to move container 122d onto a return conveyer branch 172. Optical profile measuring apparatus 134 controls the operation of cylinders 154, 162 and 168 via a line 174. Profile measuring apparatus 134, system 100 and/or weight station 146 control gate 158 via line 150 and activate gate 158 when container 122e has an unacceptable profile, weight or pushup so that the unacceptable container 122e is forced into the reject deposit area 160. If container 122f has an acceptable weight, pushup and profile, a return conveyor branch 172 returns it to conveyer 140.

Optical profile measuring apparatus 134 communicates with container molding apparatus 138, cavity identification system 142, weight station 146 and system 100 via line 152. In the event that a container 122 of unacceptable profile is measured, profile measuring apparatus 134 via communication with cavity identification system 142, determines the cavity of the container and can operate gate 148 via line 150 to profile additional containers 122 from the suspect cavity. In the event that a pattern failure is discovered, profile measuring apparatus 134 can notify container molding apparatus 138 of the failure or alternatively notify an operator so that the failure can be corrected, so that use of the particular cavity producing the failed containers can be discontinued, or so that the entire system can be shut doom for repairs.

As shown in FIG. 5, conveyer branch 144 constitutes an infeed conveyor for transporting container 122 to a position adjacent base 130 and pneumatic cylinder 164 constitutes a first pusher for positioning container 122 on base 130. Thus, conveyor branch 144 in combination with pneumatic cylinder 164 constitutes a first mover for transporting container 122 from the container handling apparatus to base 130. Likewise, return conveyor branch 172 constitutes an outfeed conveyor for transporting container 122 from a position adjacent base 130 and pneumatic cylinder 168 constitutes a second pusher for transporting container 122 from base 130 to the outfeed conveyor. Thus, return conveyor branch 172 in combination with pneumatic cylinder 168 constitutes a second mover for transporting container 122 from base 130 to the container handling apparatus.

According to the invention, pneumatic cylinder 162 includes circuit 106 for providing position feedback information regarding the position of container 122 relative to sensor 102. In one embodiment, height sensor 102 reads the pushup height when bottom 124 of container 122 is approximately centered above sensor 102 based on the detected position. In an alternative embodiment, height sensor 102 determines the pushup height as pneumatic cylinder 162 pushes container 122 across the top of sensor 102 to determine a profile of the pushup. In this sense, the term "profile" means an internal profile or outline of a cross-sectional view of container 122. Processor 108 comprises a circuit for determining a profile of bottom 124 as a function of the determined height of raised portion 128 relative to the detected position of container 122.

Pneumatic cylinder 162 is preferably endbodied by a cylinder such as the Binba Position Feedback Cylinder. Feedback cylinders of this type include a resistive circuit, such as a rheostat, to provide the position feedback information. In other words, the position feedback circuit provides a voltage signal representative of the stroke position of the push rod 164, which is indicative of the position of container 122 as it is being pushed.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A system for use with a glass container handling apparatus, said system for inspecting glass containers handled by the apparatus to determine a height of a bottom of the containers, said bottom of the containers including an inwardly hollowed portion, said system comprising:
   a base adapted to be positioned adjacent the container handling apparatus and adapted to receive the bottom of the containers handled by the container handling apparatus, at least one of the containers being positioned on the base;
   a proximity sensor for generating a signal representative of a distance between a surface of the proximity sensor and the bottom of the positioned container, said distance being a function of the height of the bottom of the positioned container relative to the base; and
   a processor receiving and responsive to the signal from the proximity sensor for determining the height of the inwardly hollowed portion of the bottom of the positioned container based on the distance as indicated by the signal.

2. The system of claim 1 further comprising a memory for storing predetermined information corresponding to the height of the bottom of the containers and the distance as indicated by the signal from the proximity sensor and wherein the processor retrieves the predetermined height information from the memory in response to the signal from the proximity sensor.

3. The system of claim 2 wherein the predetermined information stored in the memory comprises a table of values, each of the values corresponding to the signal from the proximity sensor when a plate of glass positioned a reference distance above the surface of the proximity sensor.

4. The system of claim 1 further comprising a reference sensor positioned adjacent the proximity sensor for use in calibrating the proximity sensor, said reference sensor sensing a reference distance that is generally independent of the height of the bottom of the containers and generating a signal representative of the reference distance.

5. The system of claim 4 wherein the processor comprises a circuit responsive to the signal from the reference sensor for calibrating the proximity sensor as a function of changes in the signal from the reference sensor over time thereby compensating for the effects of temperature and/or humidity on the sensed distance.

6. The system of claim 4 further comprising a memory for storing predetermined information corresponding to the height of the bottom of the containers and the distance as indicated by the signal from the proximity sensor and wherein the processor retrieves the predetermined height information from the memory as a function of a parameter $V_{COMP}$ which is defined by $V_{COMP}=(V_{RAM}*V_{CAL})/V_{REF}$; wherein $V_{RAW}$ is a value corresponding to the signal from the proximity sensor; wherein $V_{CAL}$ is a value stored in the memory corresponding to the signal from the reference sensor when the predetermined height information was stored in the memory; and wherein $V_{REF}$ is a value corresponding to the signal from the reference sensor.

7. The system of claim 1 wherein the positioned container is a reference container having a known height of the bottom and the processor comprises a circuit for comparing the determined height of the bottom of the positioned container to the known height, and wherein the processor calculates a correction factor as a function of the known height relative to the determined height for use in calibrating the proximity sensor.

8. The system of claim 1 further comprising a position sensor for detecting the position of the containers relative to the proximity sensor and wherein the processor determines the height of the bottom of the positioned container at approximately the center of the bottom.

9. The system of claim 8 further comprising a first pusher for moving the positioned container across the base and wherein the processor comprises a circuit for determining a profile of the bottom of the positioned container as it moves across the base, said profile being a function of the determined height of the bottom relative to the detected position of the container.

10. The system of claim 1 further comprising a first mover for transporting the container from the container handling apparatus to the base and a second mover for transporting the container from the base to the container handling apparatus.

11. The system of claim 10 wherein the first mover includes an infeed conveyor for transporting the container to a position adjacent the base and a first pusher for positioning the container transported by the infeed conveyor on the base.

12. The system of claim 10 wherein the second mover includes an outfeed conveyor for transporting the container from a position adjacent the base and a second pusher for transporting the container from the base to the outfeed conveyor.

13. The system of claim 1 wherein the proximity sensor comprises a capacitive sensor providing an electric field adjacent the capacitive sensor, said capacitive sensor sensing a capacitance that is affected by the bottom of the container being positioned in the electric field and generating a signal representative of the sensed capacitance, said sensed capacitance being a function of the height of the bottom of the positioned container relative to the base.

14. The system of claim 13 further comprising a memory for storing predetermined information corresponding to the height of the bottom of the containers and the sensed capacitance as indicated by the signal from the capacitive sensor and wherein the processor retrieves the predetermined height information from the memory in response to the signal from the capacitive sensor.

15. The system of claim 14 wherein the predetermined information stored in the memory comprises a table of values, each of the values corresponding to the sensed capacitance as indicated by the signal from the capacitive sensor when a plate of glass positioned a reference distance from the capacitive sensor.

16. The system of claim 13 further comprising a reference sensor positioned adjacent the capacitive sensor for use in calibrating the capacitive sensor, said reference sensor sensing a reference capacitance that is generally independent of the height of the bottom of the containers and generating a signal representative of the reference capacitance.

17. A method of operating a system for use with a glass container handling apparatus, said system for inspecting glass containers handled by the apparatus to determine a height of a bottom of the containers relative to a base positioned adjacent the apparatus and adapted to receive the bottom of the containers handled by the container handling apparatus, said bottom of the containers including an inwardly hollowed portion, said method comprising the steps of:

positioning at least one of the containers on the base;

generating a signal representative of a distance between a surface of a proximity sensor and the bottom of the positioned container, said distance being a function of the height of the bottom of the positioned container relative to the base; and determining the height of the inwardly hollowed portion of the bottom of the positioned container based on the distance as indicated by the signal.

18. The method of claim 17 further comprising the step of storing in a memory predetermined information corresponding to the height of the bottom of the containers and the distance as indicated by the signal from the proximity sensor and wherein the step of determining the height includes retrieving the predetermined height information from the memory in response to the signal from the proximity sensor.

19. The method of claim 18 further comprising the step of positioning a plate of glass a plurality of reference distances above the surface of the proximity sensor and wherein the storing step includes storing in the memory a table of values, each of the values corresponding to the signal from the proximity sensor when the plate of glass is positioned one of the reference distances above the surface of the proximity sensor.

20. The method of claim 17 further comprising the step of sensing a reference distance with a reference sensor positioned adjacent the proximity sensor, said reference sensor being generally independent of the height of the bottom of the containers, and the step of generating a signal representative of the reference distance.

21. The method of claim 20 further comprising the step of calibrating the proximity sensor in response to the signal from the reference sensor as a function of changes in the signal from the reference sensor over time thereby compensating for the effects of temperature and/or humidity on the sensed distance.

22. The method of claim 20 further comprising the steps of storing in a memory predetermined information corresponding to the height of the bottom of the containers and the distance as indicated by the signal from the proximity sensor and retrieving the predetermined height information from the memory as a function of a parameter $V_{COMP}$ which is defined by $V_{COMP}=(V_{RAW}*V_{CAL})/V_{REF}$; wherein $V_{RAW}$ is a value corresponding to the signal from the proximity sensor; wherein $V_{CAL}$ is a value stored in the memory corresponding to the signal from the reference sensor when the predetermined height information was stored in the memory; and wherein $V_{REF}$ is a value corresponding to the signal from the reference sensor.

23. The method of claim 17 wherein the positioned container is a reference container having a known height of the bottom and further comprising the steps of comparing the determined height of the bottom of the positioned container to the known height and calculating a correction factor as a function of the known height relative to the determined height for use in calibrating the proximity sensor.

24. The method of claim 17 further comprising the step of detecting the position of the containers relative to the proximity sensor and wherein the step of determining the height includes determining the height of the bottom of the positioned container at approximately the center of the bottom.

25. The method of claim 24 further comprising the steps of moving the positioned container across the base and determining a profile of the bottom of the positioned container as it moves across the base, said .profile being a function of the determined height of the bottom relative to the detected position of the container.

26. The method of claim 17 further comprising the steps of transporting the container from the container handling apparatus to the base and transporting the container from the base to the container handling apparatus.

27. The method of claim 17 wherein the proximity sensor comprises a capacitive sensor and further comprising the steps of providing an electric field adjacent the capacitive sensor, sensing a capacitance that is affected by the bottom of the container being positioned in the electric field and generating a signal representative of the sensed capacitance, said sensed capacitance being a function of the height of the bottom of the positioned container relative to the base.

28. The method of claim 27 further comprising the step of storing in a memory predetermined information corresponding to the height of the bottom of the containers and the sensed capacitance as indicated by the signal from the capacitive sensor and wherein the step of determining the height includes retrieving the predetermined height information from the memory in response to the signal from the capacitive sensor.

29. The method of claim 28 further comprising the step of positioning a plate of glass a plurality of reference distances from the capacitive sensor and wherein the storing step includes storing in the memory a table of values, each of the values corresponding to the sensed capacitance when the plate of glass is positioned one of the reference distances from the capacitive sensor.

30. The method of claim 27 further comprising the step of sensing a reference capacitance with a reference sensor positioned adjacent the capacitive sensor, said reference capacitance being generally independent of the height of the bottom of the containers, and the step of generating a signal representative of the reference capacitance.

31. An apparatus for handling a glass container, said container having a bottom including an inwardly hollowed portion, comprising:

a base adapted to receive the container;

a first mover for transporting the container to the base;

a proximity sensor for generating a signal representative of a distance between a surface of the proximity sensor and the bottom of the container on the base, said distance being a function of the height of the bottom of the positioned container relative to the base;

a processor receiving and responsive to the signal from the proximity sensor for determining the height of the inwardly hollowed portion of the container bottom based on the distance as indicated by the signal; and a second mover for transporting the container from the base.

* * * * *